United States Patent
Lipcon et al.

(10) Patent No.: US 9,753,954 B2
(45) Date of Patent: Sep. 5, 2017

(54) DATA NODE FENCING IN A DISTRIBUTED FILE SYSTEM

(71) Applicant: Cloudera, Inc., Palo Alto, CA (US)

(72) Inventors: Todd Lipcon, San Francisco, CA (US); Aaron T. Myers, Palo Alto, CA (US); Eli Collins, Palo Alto, CA (US)

(73) Assignee: Cloudera, Inc., Palo Alto, CA (US)

( * ) Notice: Subject to any disclaimer, the term of this patent is extended or adjusted under 35 U.S.C. 154(b) by 538 days.

(21) Appl. No.: 14/024,585

(22) Filed: Sep. 11, 2013

(65) Prior Publication Data
US 2014/0081927 A1 Mar. 20, 2014

Related U.S. Application Data

(60) Provisional application No. 61/701,541, filed on Sep. 14, 2012.

(51) Int. Cl.
| | |
|---|---|
| *G06F 17/30* | (2006.01) |
| *G06F 15/16* | (2006.01) |
| *G06F 11/20* | (2006.01) |
| *H04L 12/24* | (2006.01) |

(52) U.S. Cl.
CPC .... *G06F 17/30303* (2013.01); *G06F 11/2028* (2013.01); *G06F 17/30197* (2013.01); *G06F 11/2038* (2013.01); *G06F 11/2046* (2013.01); *H04L 41/0836* (2013.01)

(58) Field of Classification Search
CPC ......... G06F 17/30194; G06F 17/30067; G06F 17/30224; H04L 41/0836
USPC ................ 707/793, 822, 825, 827; 714/4.11; 709/203, 213, 217, 220, 223–226, 709/245–246
See application file for complete search history.

(56) References Cited

U.S. PATENT DOCUMENTS

| | | | |
|---|---|---|---|
| 5,325,522 A | 6/1994 | Vaughn | |
| 5,825,877 A | 10/1998 | Dan et al. | |
| 5,875,290 A * | 2/1999 | Bartfai | G06F 11/2023 714/1 |
| 6,542,930 B1 | 4/2003 | Auvenshine | |
| 6,553,476 B1 | 4/2003 | Ayaki et al. | |
| 6,651,242 B1 | 11/2003 | Hebbagodi et al. | |
| 6,678,244 B1 * | 1/2004 | Appanna | H04L 47/17 370/229 |
| 6,678,828 B1 | 1/2004 | Zhang et al. | |
| 6,687,847 B1 | 2/2004 | Aguilera et al. | |
| 6,931,530 B2 | 8/2005 | Pham et al. | |
| 6,990,606 B2 * | 1/2006 | Schroiff | G06F 11/2023 714/4.11 |
| 7,031,981 B1 | 4/2006 | DeLuca et al. | |
| 7,042,839 B2 * | 5/2006 | Stewart | H04L 45/00 370/227 |

(Continued)

OTHER PUBLICATIONS

IBM, Planning a Cluster, 1998 International Business Machines Corporation, pp. 1-27.*

(Continued)

*Primary Examiner* — Frantz Coby
(74) *Attorney, Agent, or Firm* — Perkins Coie LLP

(57) ABSTRACT

Systems and methods for data node fencing in a distributed file system to prevent data inconsistencies and corruptions are disclosed. An embodiment includes implementing a protocol whereby data nodes detect a failover and determine an active name node based on transaction identifiers associated with transaction requests. The data nodes also provide to the active name node block location information and an acknowledgment. The embodiment further includes a protocol whereby a name node refrains from issuing invalidation requests to the data nodes until the name node receives acknowledgments from all data nodes that are functional.

9 Claims, 6 Drawing Sheets

(56) References Cited

U.S. PATENT DOCUMENTS

| | | | |
|---|---|---|---|
| 7,069,497 B1 | 6/2006 | Desai | |
| 7,107,323 B2 | 9/2006 | Hara et al. | |
| 7,143,288 B2 | 11/2006 | Pham et al. | |
| 7,181,480 B1 * | 2/2007 | Nikiel | |
| 7,325,041 B2 | 1/2008 | Hara et al. | |
| 7,398,394 B1 * | 7/2008 | Johnsen | H04L 63/08 713/150 |
| 7,478,263 B1 * | 1/2009 | Kownacki | G06F 11/2028 714/10 |
| 7,487,228 B1 | 2/2009 | Preslan et al. | |
| 7,496,829 B2 | 2/2009 | Rubin et al. | |
| 7,617,369 B1 * | 11/2009 | Bezbaruah | G06F 11/2074 707/999.2 |
| 7,620,698 B2 | 11/2009 | Hara et al. | |
| 7,631,034 B1 | 12/2009 | Haustein et al. | |
| 7,640,512 B1 | 12/2009 | Appling | |
| 7,640,582 B2 * | 12/2009 | Beck | H04L 63/12 707/999.001 |
| 7,653,668 B1 | 1/2010 | Shelat et al. | |
| 7,685,109 B1 | 3/2010 | Ransil et al. | |
| 7,698,321 B2 | 4/2010 | Hackworth | |
| 7,721,324 B1 * | 5/2010 | Jackson | H04L 41/28 709/225 |
| 7,734,961 B2 | 6/2010 | Almoustafa et al. | |
| 7,818,313 B1 | 10/2010 | Tsimelzon et al. | |
| 7,831,991 B1 | 11/2010 | Kiraly | |
| 7,937,482 B1 | 5/2011 | Vermeulen et al. | |
| 7,961,602 B2 * | 6/2011 | Tochio | H04L 45/22 370/227 |
| 7,970,861 B2 | 6/2011 | Simitci et al. | |
| 8,024,560 B1 | 9/2011 | Alten | |
| 8,069,267 B2 | 11/2011 | Powers-Boyle et al. | |
| 8,108,338 B2 | 1/2012 | Castro et al. | |
| 8,108,771 B2 | 1/2012 | Chijiiwa et al. | |
| 8,151,347 B2 * | 4/2012 | Beck | H04L 63/12 713/165 |
| 8,306,919 B2 | 11/2012 | Sakamura et al. | |
| 8,311,980 B2 | 11/2012 | Saito et al. | |
| 8,336,108 B2 * | 12/2012 | Suit | H04L 63/126 709/223 |
| 8,468,244 B2 | 6/2013 | Redlich et al. | |
| 8,484,716 B1 | 7/2013 | Hodgson et al. | |
| 8,533,231 B2 * | 9/2013 | Aizman | 707/793 |
| 8,595,546 B2 * | 11/2013 | Dalton | 714/4.1 |
| 8,655,939 B2 | 2/2014 | Redlich et al. | |
| 8,667,267 B1 | 3/2014 | Garcia et al. | |
| 8,689,043 B1 * | 4/2014 | Bezbaruah | G06F 11/2058 711/162 |
| 8,788,815 B1 | 7/2014 | Garcia et al. | |
| 8,819,476 B2 * | 8/2014 | Roth | 714/1 |
| 8,862,928 B2 * | 10/2014 | Xavier | 714/4.11 |
| 8,943,355 B2 * | 1/2015 | Hsu | 714/4.11 |
| 2002/0055989 A1 | 5/2002 | Stringer-Calvert et al. | |
| 2002/0073322 A1 | 6/2002 | Park et al. | |
| 2002/0138762 A1 | 9/2002 | Horne | |
| 2002/0174194 A1 | 11/2002 | Mooney et al. | |
| 2003/0051036 A1 | 3/2003 | Wang et al. | |
| 2003/0055868 A1 | 3/2003 | Fletcher et al. | |
| 2003/0093633 A1 | 5/2003 | Thiesfeld et al. | |
| 2004/0003322 A1 | 1/2004 | Collins et al. | |
| 2004/0059728 A1 | 3/2004 | Miller et al. | |
| 2004/0103166 A1 | 5/2004 | Bae et al. | |
| 2004/0172421 A1 | 9/2004 | Saito et al. | |
| 2004/0186832 A1 | 9/2004 | Jardin | |
| 2005/0044311 A1 | 2/2005 | Lahiri et al. | |
| 2005/0071708 A1 | 3/2005 | Bartfai et al. | |
| 2005/0091244 A1 | 4/2005 | Marcotte | |
| 2005/0138111 A1 | 6/2005 | Aton et al. | |
| 2005/0171983 A1 | 8/2005 | Deo et al. | |
| 2005/0182749 A1 | 8/2005 | Matsui | |
| 2006/0020854 A1 | 1/2006 | Cardona et al. | |
| 2006/0023627 A1 * | 2/2006 | Villait | G06F 11/2025 370/222 |
| 2006/0050877 A1 | 3/2006 | Nakamura | |
| 2006/0143453 A1 | 6/2006 | Imamoto et al. | |
| 2006/0156018 A1 | 7/2006 | Lauer et al. | |
| 2006/0224784 A1 | 10/2006 | Nishimoto et al. | |
| 2006/0247897 A1 | 11/2006 | Lin | |
| 2007/0100913 A1 | 5/2007 | Sumner et al. | |
| 2007/0113188 A1 | 5/2007 | Bales et al. | |
| 2007/0136442 A1 | 6/2007 | Palma et al. | |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0234115 A1 | 10/2007 | Saika | |
| 2007/0255943 A1 | 11/2007 | Kern et al. | |
| 2007/0282988 A1 | 12/2007 | Bornhoevd et al. | |
| 2008/0140630 A1 | 6/2008 | Sato et al. | |
| 2008/0168135 A1 | 7/2008 | Redlich et al. | |
| 2008/0244307 A1 | 10/2008 | Dasari et al. | |
| 2008/0256486 A1 | 10/2008 | Hagiwara | |
| 2008/0263006 A1 | 10/2008 | Wolber et al. | |
| 2008/0276130 A1 | 11/2008 | Almoustafa et al. | |
| 2008/0307181 A1 | 12/2008 | Kuszmaul et al. | |
| 2009/0013029 A1 | 1/2009 | Childress et al. | |
| 2009/0177697 A1 | 7/2009 | Gao et al. | |
| 2009/0259838 A1 | 10/2009 | Lin | |
| 2009/0307783 A1 | 12/2009 | Maeda et al. | |
| 2010/0008509 A1 | 1/2010 | Matsushita et al. | |
| 2010/0010968 A1 | 1/2010 | Redlich et al. | |
| 2010/0070769 A1 | 3/2010 | Shima et al. | |
| 2010/0131817 A1 | 5/2010 | Kong et al. | |
| 2010/0179855 A1 | 7/2010 | Chen et al. | |
| 2010/0198972 A1 | 8/2010 | Umbehocker | |
| 2010/0296652 A1 | 11/2010 | Nakayama et al. | |
| 2010/0306286 A1 | 12/2010 | Chiu et al. | |
| 2010/0325713 A1 | 12/2010 | Kurita et al. | |
| 2011/0055578 A1 | 3/2011 | Resch | |
| 2011/0078549 A1 | 3/2011 | Thueringer et al. | |
| 2011/0119328 A1 | 5/2011 | Simitci et al. | |
| 2011/0154016 A1 * | 6/2011 | Niccolini | H04L 63/0428 713/150 |
| 2011/0179160 A1 | 7/2011 | Liu et al. | |
| 2011/0191832 A1 * | 8/2011 | Davis | G06F 21/00 726/5 |
| 2011/0228668 A1 | 9/2011 | Pillai et al. | |
| 2011/0246816 A1 | 10/2011 | Hsieh et al. | |
| 2011/0246826 A1 | 10/2011 | Hsieh et al. | |
| 2011/0276396 A1 | 11/2011 | Rathod | |
| 2011/0276495 A1 | 11/2011 | Varadarajan et al. | |
| 2011/0280123 A1 * | 11/2011 | Wijnands | H04L 45/507 370/228 |
| 2011/0302417 A1 | 12/2011 | Whillock et al. | |
| 2011/0307534 A1 | 12/2011 | Peng et al. | |
| 2012/0036357 A1 | 2/2012 | Struik | |
| 2012/0102072 A1 | 4/2012 | Jia et al. | |
| 2012/0130874 A1 | 5/2012 | Mane et al. | |
| 2012/0131341 A1 | 5/2012 | Mane et al. | |
| 2013/0041872 A1 | 2/2013 | Aizman et al. | |
| 2013/0061232 A1 * | 3/2013 | Bernbo | G06F 17/30212 718/103 |
| 2013/0304761 A1 | 11/2013 | Redlich et al. | |
| 2014/0019405 A1 * | 1/2014 | Borthakur | G06F 17/30194 707/609 |
| 2014/0040575 A1 * | 2/2014 | Horn | G06F 3/0688 711/162 |
| 2014/0052548 A1 * | 2/2014 | Dokken, Jr. | G06Q 50/01 705/14.73 |
| 2015/0278244 A1 * | 10/2015 | Shvachko | G06F 17/30174 707/634 |

OTHER PUBLICATIONS

Babaoglu, O., and K. Marzullo, "Consistent global states of distributed systems: Fundamental concepts and mechanisms," *Distributed Systems*, 53 pages, Jan. 1993.

Corbett et al., "Spanner: Google's Globally Distributed Database," *Transactions on Computer Systems (TOCS)*, vol. 31, No. 3, 14 pages, Aug. 2013.

(56) References Cited

OTHER PUBLICATIONS

Lamport, L., "Time, clocks, and the ordering of events in a distributed system," *Communications of the ACM*, vol. 21, No. 7, pp. 558-565, Jul. 1978.
Stoller,S.D., "Detecting global predicates in distributed systems with clocks," *Distributed Computing*, vol. 13, No. 2, pp. 85-98, Feb. 2000.
Exam Report for GB1403929.1, Applicant: Cloudera, Inc. Mailed May 2, 2014, 6 pages.
U.S. Appl. No. 13/854,773, filed Apr. 1, 2013, Kirkland et al.
Beomseok Nam et al: "Spatial indexing of distributed multidimensional datasets", Cluster Computing and the Grid, 2005. CCGRID 2005. IEEE International Symposium on Cardiff~Wales, UK May 9-12, 2005, Piscataway, NJ, USA,IEEE, Piscataway, NJ, USA, vol. 2, May 9, 2005, pp. 743-750.
Chapter 25: Distributed Databases ED -; ; Ramez Elmasri; Shamkant B Navathe (eds), Jan. 1, 2011 (Jan. 1, 2011), Fundamentals of Database Systems (Sixth Edition), Addison-Wesley, p. 877-927.
Cheng, Security Attack Safe Mobil and Cloud-Based One-Time Password Tokens Using Rubbing Encryption Algorithm, ACM, Jun. 2011, pp. 304-336.
Du et al., "A Pairwise Key Predistribution Scheme for Wireless Sensor Networks," ACM, May 2005, vol. 8 Issue 2, pp. 228-258.
European Search Report for European Application No. 14157984.7, mailing date Jun. 6, 2014, 10 pages.
Kim et al., Design and Implementation of a Private and Public Key Crypto Processor and Its Applicaiton to a Security System, IEEE, Feb. 2004, vol. %0, Issue 1, pp. 214-224.
Ko et al., "A Study of Encryption Algorithm for RFID tag (SEED: 8 Rounds X 64 bit block)," IEEE, s008, pp. 672-677.
Kossmann D: "The State of the Art in Distributed Query Processing", ACM Computing Surveys, ACM, New York, NY, us, vol. 32, No. 4, Dec. 1, 2000, pp. 422-469.
Non-Final Office Action for U.S. Appl. No. 13/362,695, mailed Apr. 29, 2013, 23 pgs.
Tamer Dzsu et al: "Principles of Distributed Database Systems", Principles of Distributed Database Systems, XX, XX, Jan. 1, 1991 (Jan. 1, 1991), pp. 74-93.

\* cited by examiner

DATA NODE FENCING IN A DISTRIBUTED FILE SYSTEM

CROSS-REFERENCE TO RELATED APPLICATIONS AND EFFECTIVE FILING DATE ENTITLEMENT

The present application claims priority to and benefit from U.S. Provisional Patent Application Ser. No. 61/701,541 titled "Data Node Fencing in A Distributed File System", filed on Sep. 14, 2012, the content of which is incorporated by reference herein. This application is therefore entitled to an effective filing date of Sep. 14, 2012.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2013, Cloudera, Inc., All Rights Reserved.

BACKGROUND

The architecture of a distributed file system such as a Hadoop Distributed File System (HDFS) typically has a name node that hosts the file system index, and a cluster of data nodes, each of which hosts units of data called blocks. The name node is the single point of failure that impacts the availability of a HDFS, as the system relies on the file system index hosted by the name node to access the data stored in the data nodes. In order to lessen the impact of an HDFS outage to internal and external users, and directly serve user requests in real time, high availability (HA) can be added to the HDFS name node. An HA architecture allows the main name node to fail over to a backup name node.

Even though in an HA architecture, only one name node can be active and send commands to data nodes, in certain scenarios, a data node may receive commands from name nodes that are not currently active. This anomaly may arise under various circumstances. For example, if one of the network interfaces of the first name node fails, and a decision to change the active name node from the first name node to a second name node is made, the first name node may not be aware of the decision. In this case, the first name node may continue to send commands, and since the second name node is the active or master name node, it may also send commands. In another example, the first name node sends a command to a data node. Soon afterward, a failover occurs from the first name node to a second name node. However, if the command is not received or processed by the data node until after the failover because of a delay, such a situation may result in the data node receiving commands from both name nodes.

Similarly, two data nodes may receive the command to delete a replica of the same unit of data, leading to data loss and other issues. For example, a data block may have two replicas hosted on the first and the second data nodes, respectively, but the desired number of replicas is one. The first name node may be initially active and send a command to the first data node to delete the hosted replica. Immediately after sending this command, the first name node may crash and a failover may occur. The second name node may become active without knowing about of the command issued by the first name node. It may then send a command to the second data node to delete the hosted replica, resulting in the deletion of both replicas.

DETAILED DESCRIPTION

Figure 1:
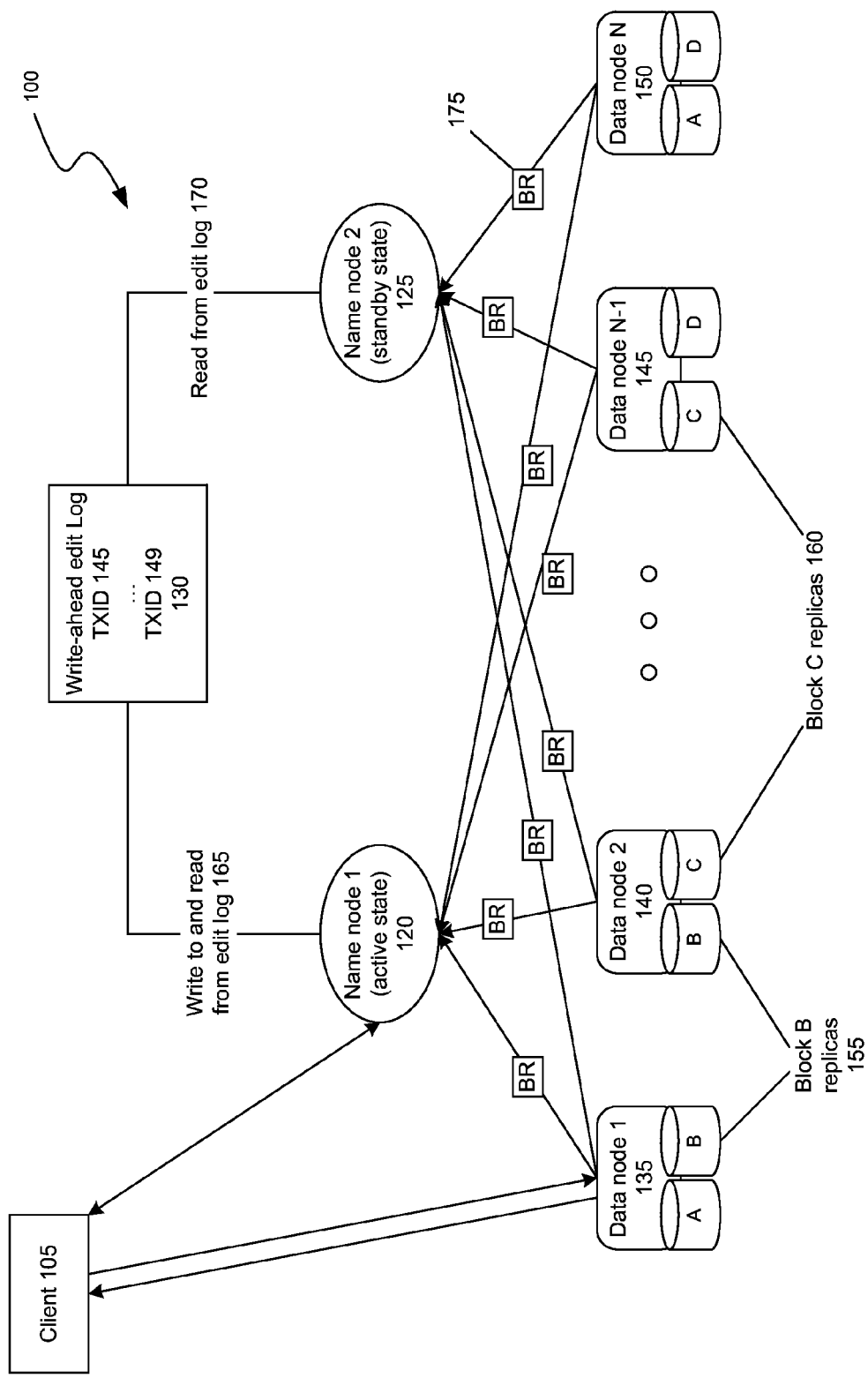
FIG. 1 is a diagram illustrating a high-availability (HA) distributed file system architecture.

The following description and drawings are illustrative and not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; such references concern at least one of the embodiments.

A reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features that are described may be exhibited by some embodiments and not by others. Similarly, various requirements which are described may be required for some embodiments but no other embodiments.

The terms used in this specification generally have their ordinary meanings in the art, within the context of the disclosure, and in the specific context in which each term is used. Certain terms used in the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, and no special significance is be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and not intended to further limit the scope and meaning of the disclosure or any exemplified term. Likewise, the disclosure is not limited to the various embodiments given in this specification.

Without intending to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

One embodiment of the present disclosure includes a method for node fencing. The method includes, for example, receiving transaction requests from data storage coordinators (e.g., name nodes), each transaction request having a transaction identifier, identifying, by a processor, one of the data storage coordinators from the transaction identifiers corresponding to the transaction requests as an active data storage coordinator, and providing a response to a transaction request from the active data storage coordinator. The response may include a block report followed by a heartbeat. In one implementation, the identification may include comparing the transaction identifiers to identify the most recently issued transaction request. The method may further comprise detecting a failover condition when the one of the data storage coordinators is different from a data storage coordinator associated with a transaction request issued proximate to the most recently issued transaction request. In some implementations, the method may include disregarding transaction requests from other data storage coordinators.

A second embodiment of the present disclosure includes a method implemented in a distributed file system including a plurality of data nodes, the method can include, for example, marking each of the plurality of data nodes as untrusted, sending a command to each of the plurality of data nodes, receiving a response from some of the plurality of data nodes, each response including information on data stored in a data node, and changing the state of data nodes providing the response to the command from untrusted to trusted.

In some implementations, the marking may be in response to a name node in the distributed file system becoming an active name node. In one implementation, the method may include sending a block deletion request to one of the plurality of data nodes when the state of each of the plurality of data nodes is changed from untrusted to trusted. In another implementation, the method may include sending a block deletion request to one of the plurality of data nodes when the state of some of the plurality of data nodes is changed from untrusted to trusted and the rest of the plurality of data nodes time out. In one implementation, the response from some of the plurality of data nodes may represent an acknowledgment that the name node sending the command is the active name node. In a further implementation, the response from some of the plurality of data nodes may represent an assurance to accept commands from only the active name node.

A third embodiment of the present disclosure includes a system having, for example, a plurality of data storage controllers in active or standby configuration and a cluster of machines configured to store data. Each machine may include a processor, a disk and a memory having stored there on instructions that when executed by the processor may cause the machine to receive transaction requests having transaction identifiers from the plurality of data storage coordinators, identify from the transaction identifiers a data storage coordinator that is active and provide a response to a transaction request from the data storage coordinator that is active.

A fourth embodiment of the present disclosure includes a system having, for example, a cluster of machines configured to store data and a plurality of data storage controllers in active or standby configuration. Each data storage controller may include a processor, a disk and a memory having stored thereon instructions that when executed by the processor may cause the controller to mark each of the machines in the cluster as untrusted, send a command or message to each of the machines, receive a response from some of the machines, each response including information on data stored in the machine and change the state of machines providing the response to the command from untrusted to trusted.

FIG. 1 contains a diagram illustrating an example architecture of a distributed file system. As shown, architecture 100 deploys two name nodes, name node 1 120 in an active role and name node 2 125 in a standby role. Architecture 100 also includes a cluster of data nodes 1 to N represented by reference numerals 135-150, each of which hosts units of data called blocks represented by letters A, B, C and D. Each data block may be replicated and stored in one or more data nodes. For example, block B may be stored in data nodes 1 and 2 as indicated by reference numeral 155, while block C may be stored in data nodes 2 and N-1 as indicated by reference numeral 160. Data nodes respond to read and write requests from the file system's client 105. Client 105 obtains file system metadata from the name nodes. In architecture 100, when name node 1 becomes unavailable (e.g., due to failure or other reasons), name node 2 may take over the role of name node 1 with no downtime. This automatic switching to a backup name node due to failure of the active name node is generally referred to as a failover. The capability to perform this switch or failover with zero downtime is realized by making sure that name node 2 has the most complete and up-to-date file system state possible in memory.

The file system state may be defined by two types of file system metadata served by the active name node (e.g., name node 1 in FIG. 1), namely the file system namespace information and block locations. To facilitate sharing of the file system state between the active and standby name nodes, the file system may use a special shared edits directory or write-ahead edit log 130 that is available via a network file system. All actions taken by the active name node may be entered as transactions in the edit log. For example, all changes to the namespace information, such as file renames, permission changes, file creations, replications, deletions, and the like, may be written to the edit log by the active name node before returning success to a client call. The edit log can include file-level metadata change such as, "change file X from replication level 3 to 1." The edit log usually does not include replica-level information such as "delete block B from data node D1." Each transaction entered on the edit log may be assigned a transaction identifier (TXID) or a sequence identifier (SQNID). The transaction identifier may be a number that increases with each new transaction entry to the edit log. For example, when a user creates a directory, the "MKDIR" operation for creating the directory can be assigned the next transaction identifier. The transaction identifier can also be incremented when a name node becomes active. For example, when a name node becomes active, the name node creates a new segment in the edit log. This transaction type is called "START_LOG_SEGMENT" and is also assigned a transaction identifier. The edit log may be read/write accessible (165) from the active name node, while the standby name node may have read-only access (170) to the edit log. The standby name node may poll the edit log frequently, looking for new edits written by the active name node, and may read such edits into its own in-memory view of the file system state. In addition to the edit log, periodic checkpoints of the file system (e.g., fsimage) may also be created and stored on a disk on the name node.

Block locations are usually not written to the edit log, and thus reading from the edit log may not be sufficient to share the file system metadata. As such, the file system may be configured to allow the active and standby name nodes to receive up-to-date block location information via block reports (e.g., 175) from data nodes 135-150. All data nodes in the cluster may be configured with the network addresses of both the active and standby name nodes. Data nodes may send all the block reports, block location updates, and heartbeats to both active and standby name nodes, but act on only block commands issued by the currently active name node. Adverse circumstances may occur where, for example, a data node has pending deletions for which commands were received before a failover, and the newly active name node may not yet be aware of these pending deletions. However, data nodes may inform the name nodes of such pending actions as well. With both up-to-date namespace information and block locations in the standby name node, the system is equipped to perform a failover from the active name node to the standby name node with reduced or no delay.

A distributed file system (e.g., HDFS) client (e.g., 105) may go to the active name node to be served. Since multiple distinct daemons are capable of serving as the active name node for a single cluster, the client generally needs to determine which name node to communicate with at any given time. In order to make this determination, the client may support the configuration of multiple network addresses, one for each of the active and standby name nodes, which collectively represent the HA name service. The name service may be identified by a single logical Uniform Resource Identifier (URI), which is mapped to the two network addresses of the HA name nodes via client-side configuration. The client may try these addresses, and if the client makes a call to the standby name node, a result indicating that it should try elsewhere may be provided to the client. The client may try all the configured addresses in order until an active name node is found.

Data node fencing techniques discussed herein fence or isolate the data nodes from the inactive, failed or otherwise unavailable name node, such that each data node in the cluster recognizes only one name node as the active name node and honors commands from only the active name node, while rejecting commands from the backup name node or a prior active name node that erroneously still believes itself to be active. Implementation of data node fencing effectively avoids split-brained and other scenarios that lead to inconsistent data, data loss or other issues by ensuring that the data nodes make a clean failover from one name node to another.

Figure 2:
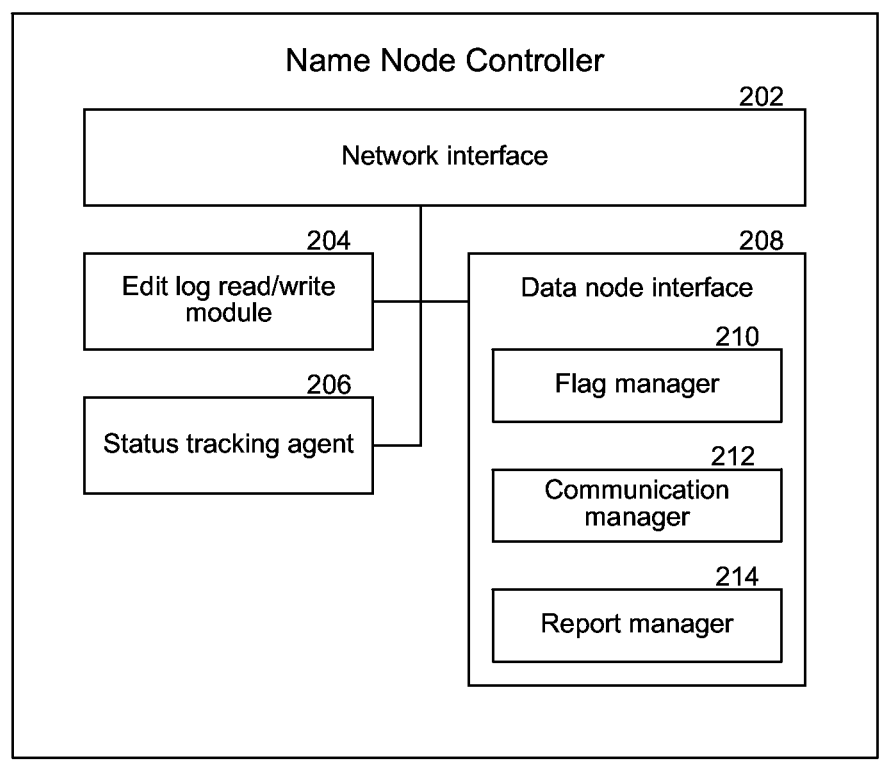
FIG. 2 is a block diagram illustrating example components of a name node.

FIG. 2 is a block diagram illustrating example components of a name node controller that controls the operation of a name node. The name node controller can include, for example, a network interface 202, an edit log read/write module 204, a status tracking agent 206 and a data node interface 208. The data node interface 208 can further include, for example, a flag manager 210, a communication manager 212, and a report manager 214. More or fewer components can be included in the name node controller and each illustrated component.

The network interface 202 can be a networking module that enables the name node to mediate data in a network with an entity that is external to the name node, through any known and/or convenient communications protocol supported by the name node and the external entity. The network interface 202 can communicate with one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

As used herein, a "module", a "manager", an "agent", a "tracker", a "handler", a "detector", an "interface", or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. §101) and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few) but may or may not be limited to hardware.

In one embodiment, the status tracking agent 206 keeps track of the active or inactive status of the name node. The edit log read/write module 204 manages the reading and possible writing activities with respect to the edit log. The flag manager 210 keeps track of the various states of the data nodes by maintaining one or more flags for each of the data notes. For example, once a name node becomes the active name node, the flag manager 210 may turn off a trust flag for each data node. After the name node receives a block report from a data node, the flag manager 210 will turn on the trust flag for the data node. The communication manager 212 is responsible for communicating with the data nodes. In one example, the communication manager 212 may send a block replication or deletion request to a data node. In another example, it may receive a response from the data node confirming the block deletion. The report manager 214 manages information regarding data distribution on the data nodes. For example, based on the block report received from a data node, the report manager 214 may update the state of data distribution maintained by the name node.

Figure 3:
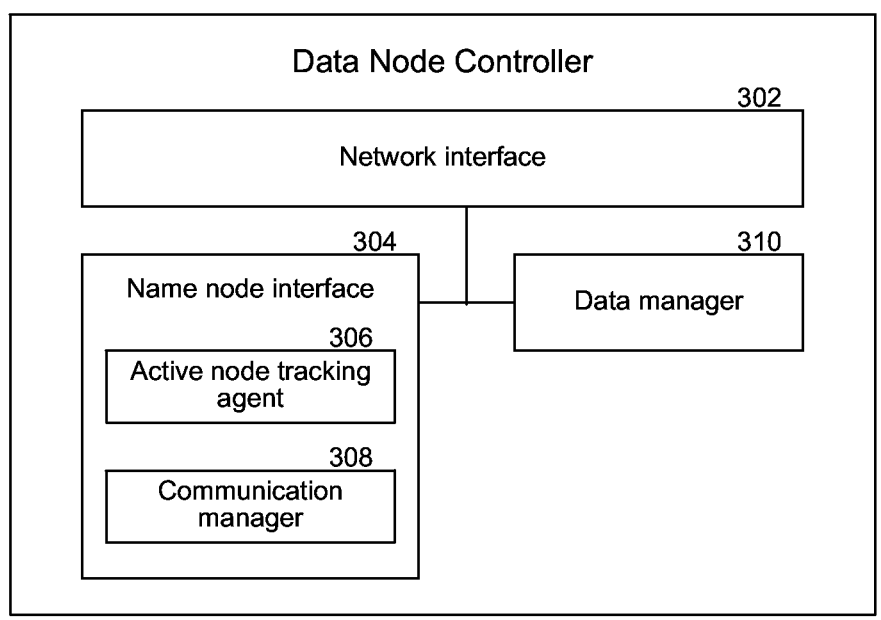
FIG. 3 is a block diagram illustrating example components of a data node.

FIG. 3 is a block diagram illustrating example components of a data node controller which controls the operation of a data node. The data node controller may include a network interface 302, a name node interface 304 and a data manager 310. The name node interface 304 may further include an active node tracking agent 306 and a communication manager 308. More or fewer components can be included in the data node and each illustrated component.

The network interface 302 can be a networking module that enables the name node to mediate data in a network with an entity that is external to the name node, through any known and/or convenient communications protocol supported by the name node and the external entity. The network interface 302 can communicate with one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, a bridge router, a hub, a digital media receiver, and/or a repeater.

As used herein, a "module", a "manager", an "agent", a "tracker", a "handler", a "detector", an "interface", or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, the active node tracking agent 306 keeps track of the active name node. The communication manager 308 is responsible for communicating with the name nodes. As one example, the communication manager 308 may receive a block deletion request from a standby name node. As another example, it may send a block report to a standby name node. The data manager 310 is in charge of activities concerning the blocks on the data node, such as replication, deletion, repair, and the like.

Figure 4:
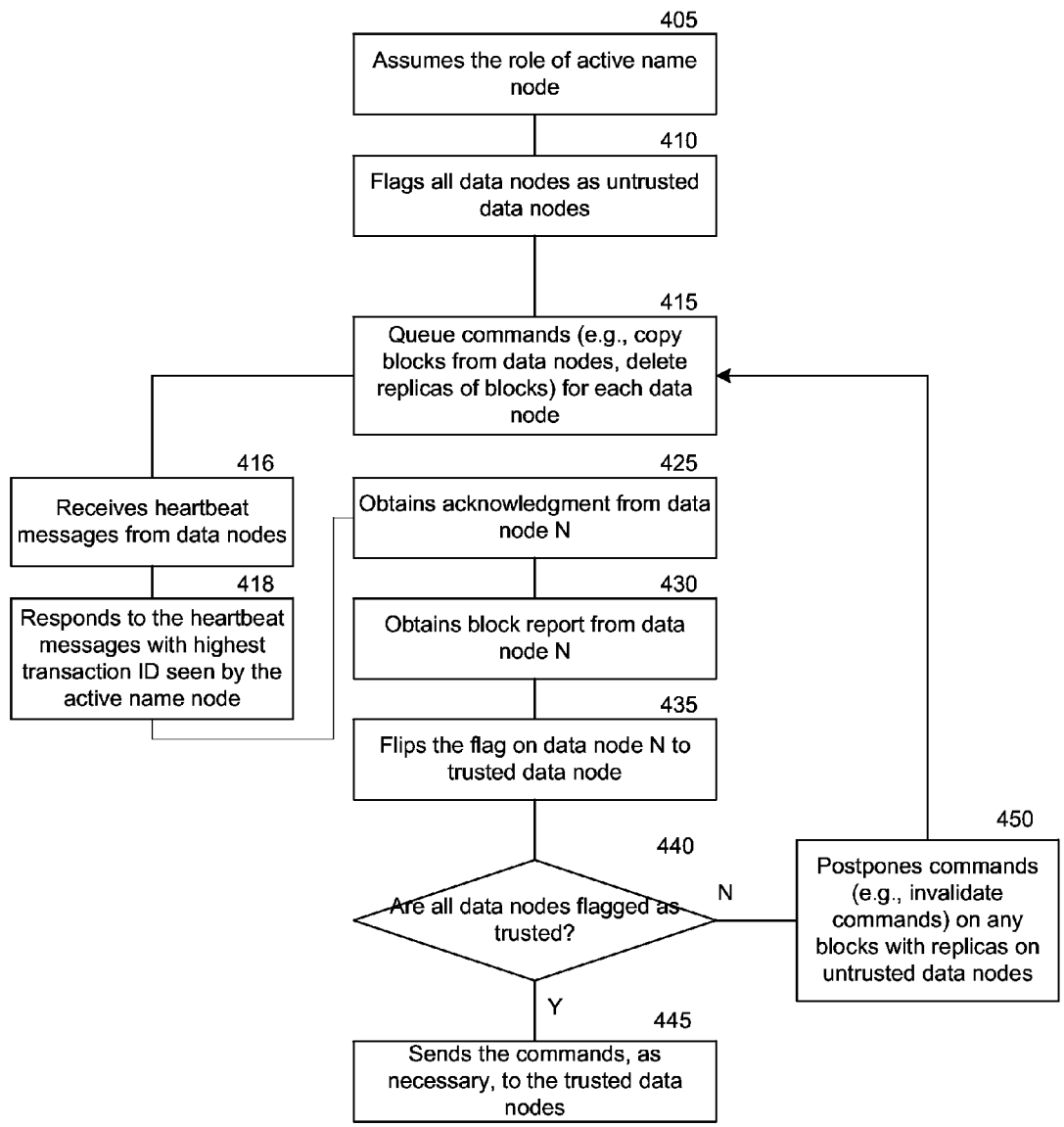
FIG. 4 contains a flowchart illustrating an example data node fencing method implemented by a name node.

FIG. 4 is a flowchart illustrating an example fencing method implemented by a name node which becomes the active name node. Initially, the status tracking agent 206 detects the designation of an active role as a result of a failover at 405. An HA daemon such as the Failover Controller can detect failure of another name node and send a message to the name node to become active. At this point, the report manager 214 may examine the metadata of block locations and realize that some blocks may have been over-replicated. However, the active data node may decide to postpone issuing data deletion and other commands as it does not yet have full information regarding each data node to safely issue such commands. Therefore, at block 410, the flag manager 210 may flag each data node as untrusted or failed to indicate that the active name node is unsure of the status of the data node. In one embodiment, the flag manager 210 may maintain an object descriptor for each data node and may specifically include a trust flag in the object descriptor. Once the name node becomes the active name node, the flag manager 210 may then set this trust flag in every object descriptor to false.

In one embodiment, to obtain full information regarding each data node, the communication manager 212 does not send specific requests to all the data nodes at once and waits for a response from each of the data nodes. Instead, when the communication manager 212 next sends a command to a data node or responds to a heartbeat message from a data node in the normal course of operation, it can expect the data node to return the full information. The active name node maintains a queue of commands for each data node which may include, for example, directions to copy blocks from other data nodes or delete replicas of blocks (e.g., when the name node has determined that a block is under- or over-replicated, respectively) at block 415. A user can issue a file-level instruction such as "reduce the replication of file X," which can cause the name node to translate the file-level instruction to a block-level command such as "remove replica R1 of block B from data node N." The name node can then queue the deletion command to be sent to data node N the next time data node N sends a heartbeat. In the normal course of operation, each data node periodically sends a heartbeat message to each name node (i.e., active and standby name nodes). The active name node receives the heartbeat messages from the data nodes at block 416. The active name node can then respond to each heartbeat message with a response that includes the highest transaction ID seen by the name node before sending the response. The transaction ID, as described above, is a sequence number that is incremented each time a name node performs a transaction. Upon receiving the transaction ID in response to a heartbeat message, a data node N may use the received transaction ID and the transaction ID last known to the data node to determine if a failover has occurred. Details of this determination are discussed with respect to FIG. 5.

At block 425, the communication manager 212 may obtain an acknowledgment from a data node N. The acknowledgment may represent an agreement that the data node N accepts the name node as the active name node. The acknowledgment may further imply that the data node will no longer accept commands from any other name nodes. At block 430, the communication manager 212 may also obtain a block report, including any pending deletions or replications, from the data node N. Including the pending deletions, as if they were real deletions, may ensure that even if block deletions are delayed due to slow local disks or other reasons, the new active name node knows that these blocks are on their way to deletion. In one implementation, the block report may include an acknowledgment (block 425) and/or a promise that the active name node will have full control of the data node. In one implementation, the flag manager 210 may also include a block report flag in the object descriptor for each data node to indicate whether the data node considers the name node active at the time when it begins generating the block report. The report manager 214 may read the block report and be appraised of any actions taken or pending that it may not have been aware of. After receiving the acknowledgment and/or block report from the data node N, the active name node will become fully aware of the status of the data node. With that full awareness, the flag manager 210 flips the trust flag for the data node to true at block 435. In the same manner, the name node can flip the flag on other data nodes to trusted data nodes when each of those data nodes responds with an acknowledgment and a block report or a block report that includes an acknowledgment.

As mentioned above, the active name node has postponed issuing data deletion commands and has queued them instead. Upon flipping a data node's trusted flag to true, the flag manager 210 may check if the trusted flags for all the data nodes are now set to true at block 440 to determine whether it is a good time to issue data deletion commands. Upon confirming that the trust flags for all the data nodes are set to true or that the trust flags for some of the data nodes are set to true while other data nodes have timed out, the report manager 214 may reexamine the status of the blocks in the cluster for potential misreplication (e.g., over-replication), and the communication manager 212 may issue data deletion commands accordingly at block 445. In one implementation, some of the commands may impact blocks with replicas on data nodes that are flagged as trusted. In such a scenario, the active name node may issue the commands to the trusted data nodes without waiting for all the other data nodes to become trusted. In one implementation, if a block is to be purged from the cluster and thus all the replicas need to be deleted, the active name node may safely invalidate all the replicas regardless of the trusted status of the data nodes. On the other hand, upon determining that the trust flag for at least one data node has not yet timed out or is still set to false, the active name node may continue postponing issuing data deletion commands while expecting block reports from additional data nodes at block 450.

Figure 5:
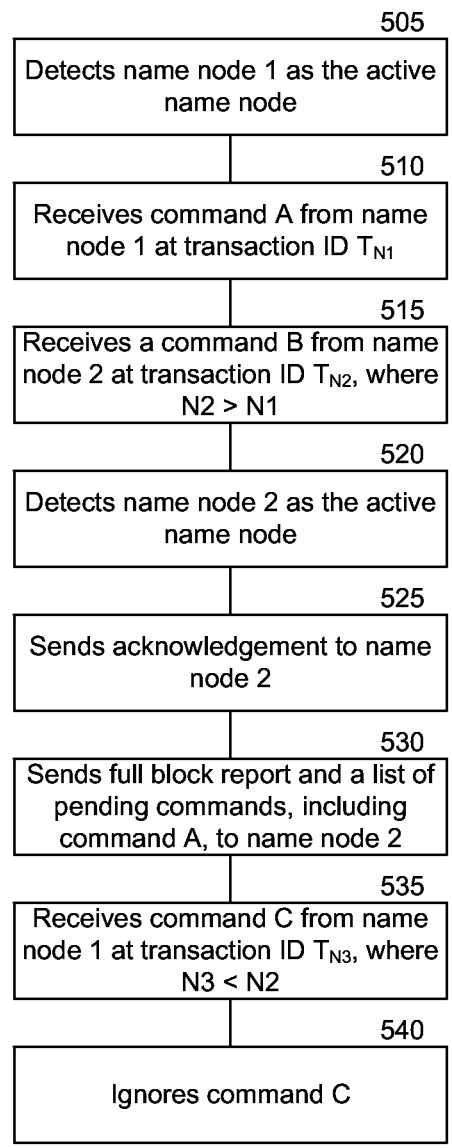
FIG. 5 contains a flowchart illustrating an example data node fencing method implemented by a data node.

FIG. 5 contains a flowchart illustrating an example data node fencing method implemented by a data node. At block 505, the active node tracking agent 306 may detect that name node 1 is the active name node. At block 510, the communication manager 308 may receive command A from name node 1, along with a transaction identifier $T_{N1}$. At block 515, the communication manager 308 may receive command B from name node 2, along with a transaction identifier $T_{N2}$, where $T_{N2}$ is greater than $T_{N1}$. At block 520, the active node tracking agent 306 can make a determination that a failover has occurred on the basis that a different name node gained write access to the edit log at a later time. Specifically, as the transaction identifiers strictly increase and are unique between the name nodes, a new name node is claiming a larger transaction number means the new name node is acquiring write access to the edit log or becoming the active name node at a later time. Therefore, upon comparing the transaction identifier $T_{N1}$ associated with name node 1 with the transaction identifier $T_{N2}$ associated with name node 2, the active node tracking agent 306 may detect that name node 1 has failed over to name node 2 and that name node 2 is the currently active name node.

At block 525, the communication manager 308 may acknowledge name node 2 as the active name node. In one implementation, the acknowledgment may be a message followed by a packet or heartbeat that is transmitted to the active name node. The acknowledgment message may imply a promise not to accept commands received from then on from other name nodes and possibly a further promise not to act on commands received previously from other name nodes. At block 530, the communication manager 308 may send a full block report created by the data manager 310, including up-to-date information on all block locations, to name node 2. In one implementation, the acknowledgment message may include the block report followed by a heartbeat. In another implementation, the block report may include the list of pending block actions, including one corresponding to command A if the data node has not acted on the command.

At block 535, the communication manager 308 may receive command C from name node 1, along with a transaction identifier $T_{N3}$, where $T_{N3}$ is less than $T_{N2}$. This may occur due to network congestion, slow local disks, or other reasons. However, since the data node already acknowledged name node 2 as the active name node, the data node may ignore command C at block 540.

The data node fencing techniques and protocols discussed above may be applicable to several scenarios in a distributed file system in general. While the data node fencing techniques and the HA architecture discussed throughout this application are applicable to clusters of any size, having more than two name nodes and multiple data nodes, the following scenarios consider a distributed file system cluster that includes two name nodes (name node 1 and 2) and two data nodes (data node 1 and 2) for ease of explanation. In the examples below, a user requests to reduce the number of replicas of a block from two to one.

Standard Failover Scenario.

In this scenario, name node 1 may ask data node 1 containing a replica of a block to delete the replica. Data node 1 may receive the command along with a transaction identifier. Data node 1 may delete the replica, and prior to sending a deletion report, name node 1 may fail over to name node 2. After the failover, both data nodes 1 and 2 may properly acknowledge that name node 2 is active and guarantee that they will not accept commands from name node 1, using the protocol outlined in FIGS. 4 and 5. Even if name node 1 continues to issue commands, such commands will be ignored. Since data node 1 was not able to send a deletion report, name node 2 may not know that data node 1 has deleted the block. As such, name node 2 may consider the block over-replicated, but may postpone sending an invalidation command since it has not received deletion reports from all the data nodes. At some point, data node 1 may send its deletion report. Data node 2 may also send a deletion report, which may be empty, for example. When name node 2 receives a deletion report from all the data nodes (data nodes 1 and 2), it knows there is only one replica of the block remaining and does not ask for deletion. In this way, data node fencing techniques prevent data loss and other issues.

Cluster Partition Scenario.

In this scenario, name node 1 may request data node 1 to delete one of the replicas. Data node 1 may receive the command and delete the replica. However, before data node 1 can report the deletion, a network partition may occur. After the partition, name node 1 and data node 1 may be on one side of a cluster, while name node 2 and data node 2 may be on the other side of the cluster. Name node 1 may think that it is still active for some period of time, but name node 2 may be the name node that is in reality active and has write access to the edit logs. Data node 1, which has already deleted a replica, may send a deletion report to name node 1, but because of the partition, it may be unsuccessful in communicating the deletion report to name node 2. Data node 2, on the other hand, remains in communication with name node 2, and may acknowledge it as the active name node. Name node 2 may still consider both data nodes 1 and 2 alive until the data nodes time out. Since name node 2 does not know about the deletion by data node 1, it may still consider the block to be over-replicated. However, according to the data node fencing protocol, it does not send deletion commands because it has not received deletion reports from all the data nodes. Eventually, name node 2 may consider data node 1 unavailable or dead (e.g., data node 1 may time out). Since data node 1, and therefore a replica of the block, is no longer in the picture, the block is no longer over-replicated. Thus, name node 2 does not delete the replica remaining on data node 2.

Split-Brain Scenario.

In this scenario, name node 1 maintains an invalidation queue for each data node and stores data deletion commands in the queues before issuing them. Name node 1 then adds a data deletion command to data node 1's invalidation queue. However, the queue may be backed up, and the command remains unissued. At this time, a failover may occur. Name node 1 may be unaware of the failover and continue considering itself active. Upon detecting a failover, data nodes 1 and 2 may save their states locally. They may acknowledge name node 2, promise not to accept any commands from name node 1, and send empty deletion reports to name node 2. After sending the report, data node 1 may crash or become unavailable. Since name node 2 has received deletion reports and acknowledgments from both data nodes, it may send a request to data node 2 to delete the block. Data node 2 may receive the deletion command and act on it. At this time, data node 1 may restart, and when it is back up, it may look up its last state before failure. In one implementation, this last state may include the acknowledgment or promise that it last made to an active name node. Data node 1 may then communicate with name node 2 directly. Without the acknowledgment or promise included in the last state, data node 1 may have connected to name node 1, which considers itself active and may proceed to issue the command in data node 1's invalidation queue. Data node 1 may then act on the command, resulting in data loss.

In one implementation, the last state may be determined based on the transaction identifier. In a further implementation, keeping the transaction identifier in the data node disks may have applicability for non-HA clusters. For example, when a name node is accidentally restarted from an old snapshot of the file system state, the data nodes may refuse to connect or refuse to process deletions based on the transaction identifiers stored in the disks. If this were not the case, the data nodes might connect to the name node and proceed to delete all of the newer blocks, which would again lead to data loss.

Figure 6:
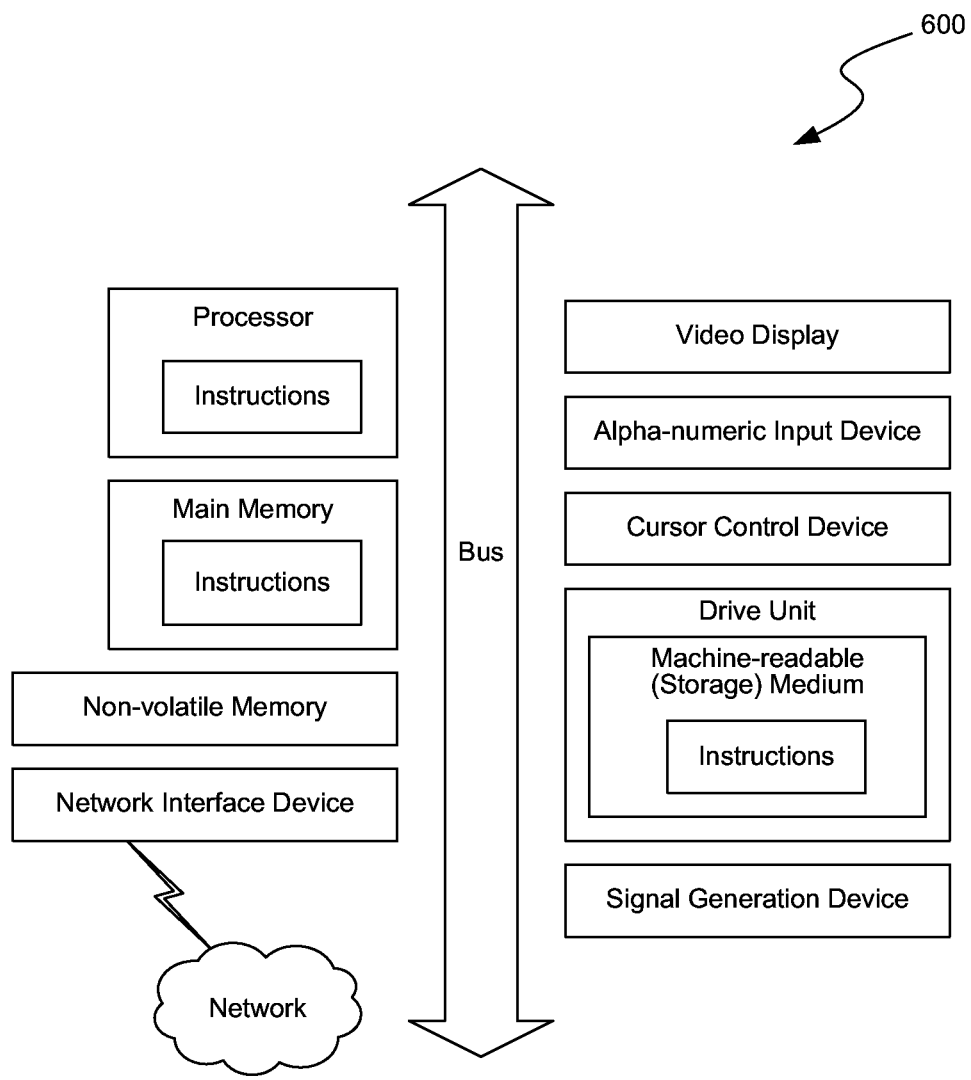
FIG. 6 shows a diagrammatic representation of a machine in the example form of a computer system within which a set of instructions, for causing the machine to perform the data node fencing methods and protocols discussed herein, may be executed.

FIG. 6 shows a diagrammatic representation of a machine in the example form of a computer system within which a set of instructions, for causing the machine to perform the data node fencing methods and protocols discussed herein, may be executed. The computer system 600 may be an embodiment of the previously described cluster nodes, including name nodes and data nodes, client, and the like.

In the example of FIG. 6, the computer system or machine 600 includes a processor, memory, disk, non-volatile memory, and an interface device. Various common components (e.g., cache memory) are omitted for illustrative simplicity. The computer system 600 is intended to illustrate a hardware device on which any of the components depicted in the example of FIG. 1 (and any other components described in this specification) can be implemented. The computer system or machine 600 can be of any applicable known or convenient type. The components of the computer system 600 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the machine 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links In general, the routines executed to implement the embodiments of the disclosure, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

What is claimed is:

1. A method for maintaining data correctness in a Hadoop™ based distributed cluster during a failover, in which an original name node is switched to a backup name node due to failure of the original name node, the distributed cluster having a plurality of data nodes and one or more processors, the method being performed by the one or more processors and comprising:
   on the backup name node:
      assuming an active role to become a new active name node, upon detecting that the original name node has failed;
      flagging all of the plurality of data nodes as untrusted;
      for each data node among the plurality of data nodes:
         queuing, instead of issuing, commands intended for a data node until the data node is flagged as trusted, and
         upon receiving an acknowledgement from the data node acknowledging the assumption of the active role of the backup name node, flagging the data node as trusted; and
   on a respective data node:
      receiving a first command with a first transaction number from a first name node;
      receiving a second command with a second transaction number from a second name node, wherein the second transaction number is greater than the first transaction number; and
      sending an acknowledgment of an active role to the second name node.

2. The method of claim 1, further comprising:
   sending a message to the data node, wherein the message includes a most recent transaction identifier known to the backup name node assuming the active role.

3. The method of claim 1, wherein commands on any block with replicated data on untrusted data nodes are queued.

4. The method of claim 1, further comprising receiving a data report in addition to the acknowledgment of the active role from the data node.

5. The method of claim 4, wherein the data report includes information regarding location of replicated data stored in the data node.

6. The method of claim 4, wherein each data report includes a list of pending deletions.

7. A Hadoop™ based distributed cluster comprising an original name node, a backup name node, and a distributed file system having a plurality of data nodes,
   wherein one or more processors of the backup name node are configured to perform:
      assuming an active role to become a new active name node, upon detecting that the original name node has failed;
      flagging all of the plurality of data nodes as untrusted;
      for each data node among the plurality of data nodes:
         queuing, instead of issuing, commands intended for a data node until the data node is flagged as trusted; and
         upon receiving an acknowledgement from the data node acknowledging the assumption of the active role of the backup name node, flagging the data node as trusted, and
   wherein one or more processors of a respective data node are configured to perform;
      receiving a first command with a first transaction number from a first name node;
      receiving a second command with a second transaction number from a second name node, wherein the second transaction number is greater than the first transaction number; and
      sending an acknowledgment of an active role to the second name node.

8. A machine-readable storage medium having stored thereon instructions which, when executed by one or more processors, configure the processors to performs a method in a Hadoop™ based distributed cluster comprising a plurality of name nodes and a plurality of data nodes and having a distributed file system, the method comprising:
   on the backup name node:
      assuming an active role to become a new active name node, upon detecting that the original name node has failed;
      flagging all of the plurality of data nodes as untrusted;
      for each data node among the plurality of data nodes;

queuing, instead of issuing, commands intended for a data node until the data node is flagged as trusted, and upon receiving an acknowledgement from the data node acknowledging the assumption of the active role of the backup name node, flagging the data node as trusted; and on a respective data node:
  receiving a first command with a first transaction number from a first name node;
  receiving a second command with a second transaction number from a second name node, wherein the second transaction number is greater than the first transaction number; and
  sending an acknowledgment of an active role to the second name node.

9. The cluster of claim 7, wherein the data nodes are configured to ignore commands from other name nodes that issue commands having a transaction identifier lower than a transaction identifier associated with a command issued by the backup name node.

\* \* \* \* \*

UNITED STATES PATENT AND TRADEMARK OFFICE
CERTIFICATE OF CORRECTION

| | | |
|---|---|---|
| PATENT NO. | : 9,753,954 B2 | Page 1 of 1 |
| APPLICATION NO. | : 14/024585 | |
| DATED | : September 5, 2017 | |
| INVENTOR(S) | : Todd Lipcon et al. | |

It is certified that error appears in the above-identified patent and that said Letters Patent is hereby corrected as shown below:

On the Title Page

On the page 3, in Column 2, under "Other Publications", Line 9, delete "Applicaiton" and insert -- Application --, therefor.

In the Specification

In Column 14, Line 13, after "links" insert -- . --.

In Column 15, Line 42, delete "¶6," and insert -- ¶ 6, --, therefor.

In Column 15, Line 45, delete "¶6" and insert -- ¶ 6 --, therefor.

In the Claims

In Column 16, Line 58, in Claim 8, delete "performs" and insert -- perform --, therefor.

Signed and Sealed this
Twenty-fourth Day of April, 2018

Andrei Iancu
*Director of the United States Patent and Trademark Office*